Sept. 28, 1954     T. W. MULLEN ET AL     2,690,029

STICK FORM RODENTICIDE DISPENSER

Filed Feb. 2, 1952                               2 Sheets-Sheet 1

INVENTORS,
THOMAS W. MULLEN,
THOMAS W. MULLEN JR.,
BY Hubert A. Weinturn,
ATTORNEY.

Sept. 28, 1954  T. W. MULLEN ET AL  2,690,029
STICK FORM RODENTICIDE DISPENSER
Filed Feb. 2, 1952  2 Sheets-Sheet 2
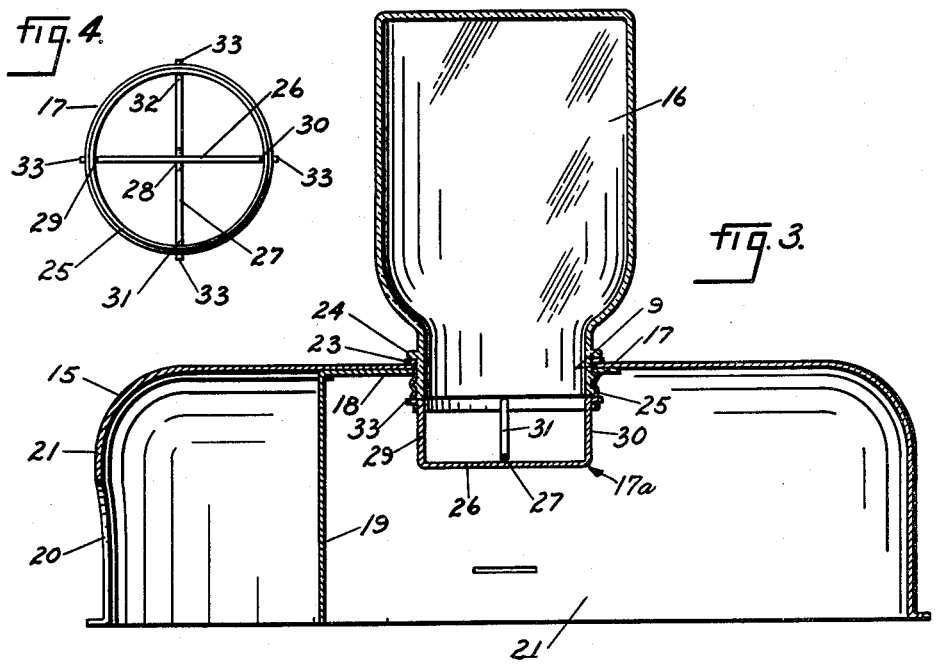
INVENTORS,
THOMAS W. MULLEN,
THOMAS W. MULLEN JR.,
BY Herbert Q. Minturn,
ATTORNEY.

Patented Sept. 28, 1954

2,690,029

UNITED STATES PATENT OFFICE 2,690,029

STICK FORM RODENTICIDE DISPENSER

Thomas W. Mullen and Thomas W. Mullen, Jr., Evansville, Ind.

Application February 2, 1952, Serial No. 269,636

4 Claims. (Cl. 43—131)

This invention relates to a dispensing device to dispense in stick form, that is in a more or less solid form, molded into a stick, of a rodenticide. One primary rodenticide intended to be dispensed by the structure is that which carries the chemical 3 - (alpha - acetonylbenzyl) - 4 - hydroxycoumarin. This is a chemical which is described in U. S. Patent No. 2,427,578 as an excellent rodenticide operating by the principle of not primarily poisoning the rodent, but affecting the blood stream in such manner that the coagulating factor is so disturbed or upset that internal hemorrhages are produced in the rodent eating the material.

Reference is made to the co-pending applications by Thomas W. Mullen, Serial No. 240,143, filed August 3, 1951, and Serial No. 269,635 filed February 2, 1952, for a Rodenticide Dispenser filed concurrently with the filing of this present application.

The chemical above referred to requires to be administered to the rodents in a mixture of some sort wherein the percentage of the chemical is quite low in comparison with the total amount of the bait to be dispensed. Heretofore, it has been quite common to dispense the chemical in baits which are "dry-flowing," that is wherein the bait has its primary basis to be a cereal such as corn meal, oats in some form, and the like, such being grains normally available to rats and mice.

However, it is now conceived that the chemical might be administered in a form easier to handle and easier to dispense, namely incorporated in some material which may be molded or extruded in to any desirable form, herein described as a "stick" meaning thereby that the material is in a column having a length greatly exceeding its cross section dimension.

Such material may embody meat products, moistened and compressed cereals, or even dehydrated vegetables, all such material being that which is readily eaten by the rodents. The sticks may be molded or extruded, to have either a casing such as would be comparable to bologna, or may be in such form as to require no external casing.

A primary purpose of the invention is to provide a structure which may be readily filled with the bait; which will readily present the bait to the rodents in a form which will be self-feeding as the bait is devoured, with the protection that the entire piece of the bait may not be carried away; and wherein the bait will be protected against consumption by animals other than the rodents desired to be killed.

Other advantages of the invention will become apparent to those skilled in the art in the following description of the invention in reference to the accompanying drawings, in which Fig. 1 is a fragmentary top plan view of a structure embodying the invention;

Fig. 3 is a vertical, diametrical section on the line 3—3 in Fig. 2; and

Fig. 4 is a view in bottom plan of a retainer cage.

Figure 1:
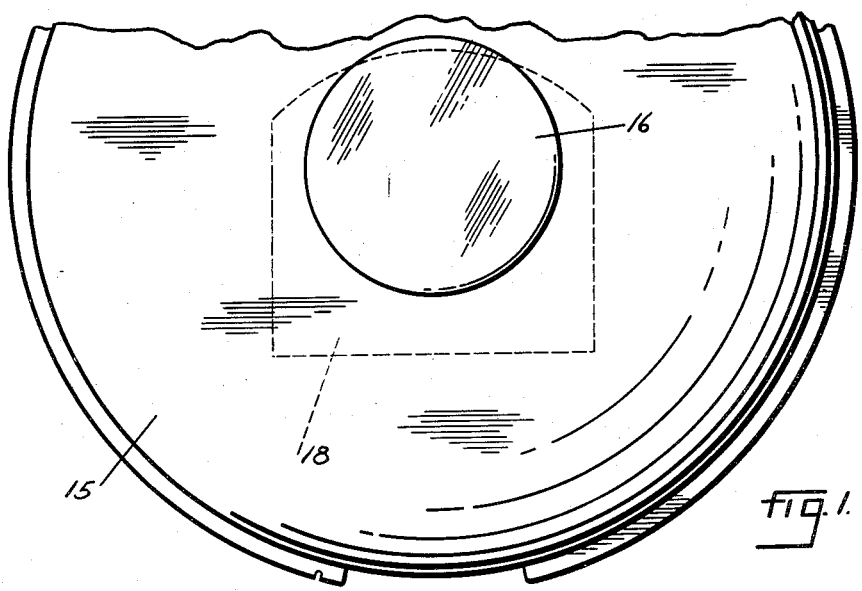

Referring to Figs. 1–4 inclusive in the drawings, the invention is shown as being incorporated in a structure which consists essentially of an inverted dome housing 15, open across its under side, and having a receptacle 16 entered through a hole 9 and screw threadedly held in an inverted position by means of a cage support 17 coming up from the inside of the housing 15 to screw-threadedly engage around the mouth end of the receptacle 16 so as to draw the receptacle downwardly against the top side of the housing 15 by having the supper end of the cage support 17 come into abutment with the under side of the housing 15 or against an intervening leg 18 of a baffle 19, the leg 18 being compressibly engaged against the under side of the housing 15.

The housing 15 is provided with a single entrance opening 20 in the side wall 21 thereof. The baffle 19 is located inwardly of the opening 20, Fig. 3, a sufficient distance to permit the rodent to enter fully within the housing 15 and turn around the baffle 19 to gain access to the space therebehind. The baffle 19 has a vertical height approximately the same as that of the interior of the housing 15.

Figure 2:
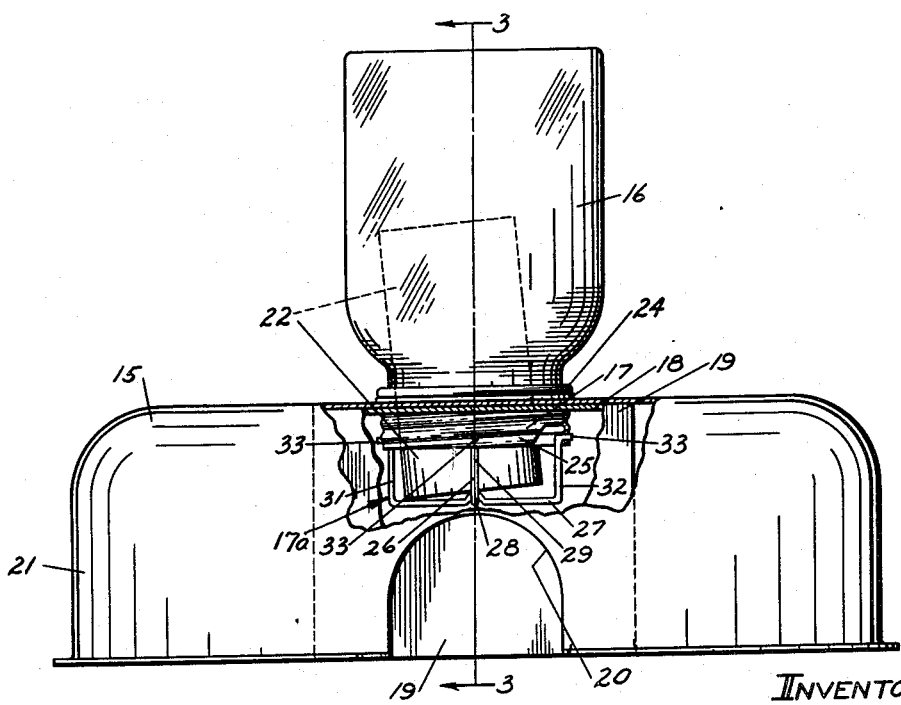
Fig. 2 is a view in entrance side elevation and partial section.

The receptacle 16 is preferably made out of glass and can be a Mason jar of any appropriate capacity, depending upon the length of the stick of bait to be employed, this stick being designated by the numeral 22, Fig. 2. A watertight seal is had by using the ordinary Mason jar gasket or "rubber" 23 between the rib 24 on the receptacle 16 and the top side of the housing 15.

The cage consists of a ferrule 25 having threads therearound to conform to the threaded end of the receptacle 16. A number of U-shaped wires constituting cage means 17a, herein shown as two and being indicated by the numerals 26 and 27, are crossed at a central zone 28, and each wire has its ends 29, 30 and 31, 32 respectively turned upwardly, each carrying an outturned foot 33 which extends through the lower end portion of the ferrule 25.

These crossed wires 26 and 27 have their crossing zone spaced below the lower end of the ferrule 25 approximately from three-quarters of an inch to one inch, in any event a distance sufficiently great to permit a rat to readily reach between the wires and nibble on the stick bait 22.

The bait 22 is placed in the receptacle 16 by taking the receptacle 16 apart from the housing 15 to have the receptacle 16 in its normal upright position, mouth end upward. Then the gasket 23 is placed over the mouth end of the receptacle 16, the housing 15 in an inverted position dropped over the mouth end to rest against the gasket 23, and the retainer cage support 17 is screw-threadedly engaged over the mouth end of the receptacle 16 and drawn up snugly. Where the baffle 19 is to be used, the baffle leg 18 is slipped over the mouth end of the receptacle 16 first before the retainer cage ferrule 25 is screw threaded thereagainst to complete the assembly. Then the entire assembly is turned over to have the open end of the housing on the under side, whereupon the bait 22 will drop down from the receptacle 16 to have its lower end resting on the crossed wires 26 and 27 as indicated in Fig. 2.

As the rodent eats away the lower end of the bait 22, it will, by the effect of gravitation, drop down to continue to rest on the cross wires 26 and 27, until the stick is completely used.

In the event that the assembly is accidentally overturned, the diameter of the housing 15 is such that the receptacle 16 will rest by its normal lower end on the ground in an inclined position such that the stick 22 will slide back therein so as to be completely removed from the mouth end of the receptacle and accordingly no access can be had to the bait by a dog, cat, or farm animals. Of course, restoring the assembly to its normal position as indicated in Fig. 2, the stick bait 22 will immediately drop down onto the cross wires.

While we have herein shown the invention in the form as now best known to us, it is obvious that structural variations may be made without departing from the spirit of the invention, and we therefore do not desire to be limited to this precise form beyond the limitations which may be imposed by the following claims.

We claim:

1. A stick form rodenticide dispenser comprising an inverted dome housing having a rodent entrance through its side and an opening through its top; a cage support carried by and within the housing centered on said housing opening; a wire-like stop member constituting a cage carried by and extending across the lower end of said cage support; said cage support being generally an open tubular shell; and a rodenticide container detachably carried above the housing centered with and opening into said cage support.

2. The structure of claim 1 in which said container has a lower end insertable within said cage support, and means interengaging said container with said cage support upon rotation of the container.

3. The structure of claim 1 in which the lower end of said container is screw-threaded; said cage support comprising a screw-threaded ferrule with a diameter exceeding that of said housing top opening; said container having a shoulder spaced from said end resting on the top side of said housing about said housing opening; the screw-threaded end of the container extending through said opening and said ferrule screw-threadedly engaging over said container end and abutting the under side of the housing top about said opening.

4. The structure of claim 2 in which said wire-like member constituting a cage is spaced below said cage support a distance to expose the lower end of a stick of rodenticide within said housing and resting on the member.

References Cited in the file of this patent

UNITED STATES PATENTS

| Number | Name | Date |
|--------|------|------|
| 382,048 | Linder et al. | May 1, 1888 |